United States Patent [19]

Hayashi et al.

[11] Patent Number: 5,134,028
[45] Date of Patent: Jul. 28, 1992

[54] THERMOPLASTIC POLYESTER SERIES RESIN FOAMED MATERIAL AND PRODUCTION PROCESS THEREOF

[75] Inventors: Motoshige Hayashi; Norio Amano; Takaaki Hirai; Takeshi Taki; Masatoshi Ishibashi, all of Nara, Japan

[73] Assignee: Sekisui Kaseihin Kogyo Kabushiki Kaisha, Nara, Japan

[21] Appl. No.: 633,851

[22] Filed: Dec. 26, 1990

[30] Foreign Application Priority Data

Dec. 27, 1989 [JP] Japan ................... 1-344249
Dec. 27, 1989 [JP] Japan ................... 1-344250
Jul. 9, 1990 [JP] Japan ................... 2-182371

[51] Int. Cl.$^5$ .................................. C08J 9/14
[52] U.S. Cl. .................................. 428/332; 264/53; 264/54; 521/79; 521/182
[58] Field of Search ........... 428/332; 521/79, 182; 264/53, 54

[56] References Cited

U.S. PATENT DOCUMENTS

| | | |
|---|---|---|
| 3,299,192 | 1/1967 | Lux . |
| 4,224,264 | 9/1980 | Ort et al. ............... 521/182 |
| 4,312,960 | 1/1982 | Ort et al. ............... 521/182 |
| 4,429,060 | 1/1984 | Ide ............... 521/182 |
| 4,462,947 | 7/1984 | Huggard . |

FOREIGN PATENT DOCUMENTS 0112058 6/1984 European Pat. Off. .
1008137 10/1965 United Kingdom .

OTHER PUBLICATIONS

Database WPI, No. 85-239402 (39), Derwent Publications Ltd., London, GB: & JP-A-155 243/bas sur Pr: 84-JP 0011523 (Toyobo K.K.) Jan. 24, 1984.
Plastverarbeiter, vol. 29, No. 5, May 1978, pp. 256-266, Speyer, DE; P. Gebauer: "Strukturschaum aus polybutylenterephthalat".
Patent Abstracts of Japan, vol. 6, No. 83, (M-130)(961), 21st May 1982, & JP-A-57 20333 (Teijin K.K.) Feb. 2, 1982.

*Primary Examiner*—Morton Foelak
*Attorney, Agent, or Firm*—Armstrong, Nikaido, Marmelstein, Kubovcik & Murray

[57] ABSTRACT

A thermoplastic polyester series foamed material having a thickness of at least 3 mm and an apparent density of from 0.05 to 0.7 g/cm$^3$ is disclosed, wherein the crystallinity of the resin in the surface portion within 0.5 mm from the surface of the foamed material is not more than 30% and at least 1% lower than the crystallinity of the resin in the central portion of the foamed material.

8 Claims, 1 Drawing Sheet

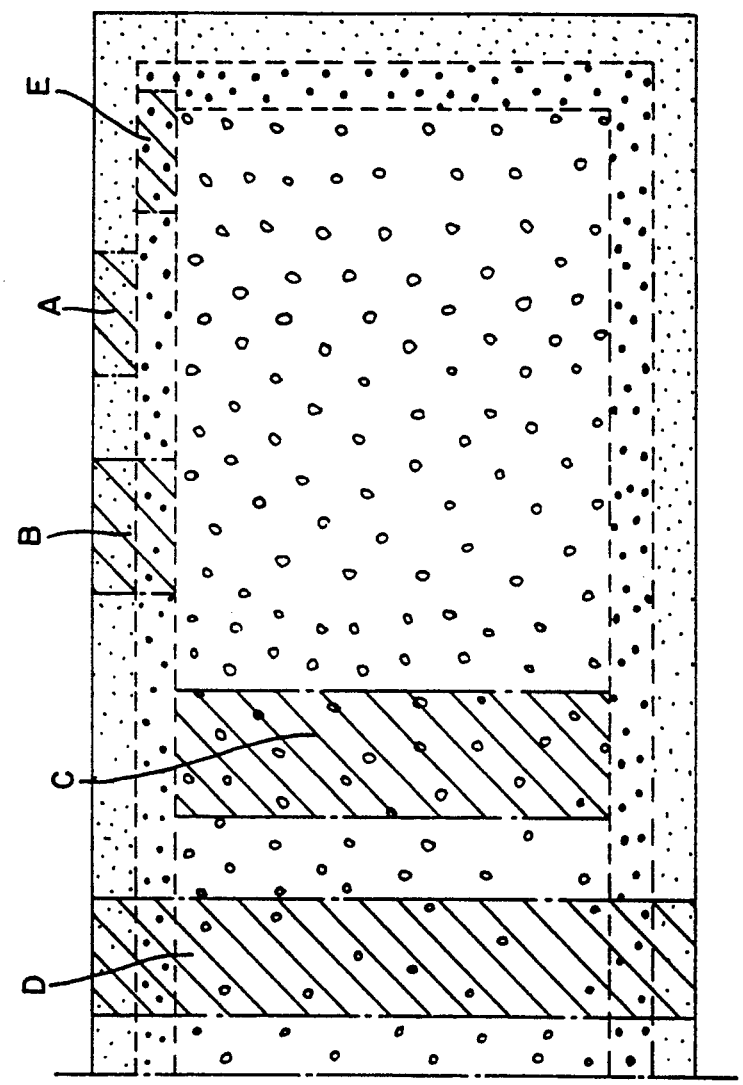

THERMOPLASTIC POLYESTER SERIES RESIN FOAMED MATERIAL AND PRODUCTION PROCESS THEREOF

FIELD OF THE INVENTION

This invention relates to a structural material composed of a foamed material of a thermoplastic polyester series resin (hereinafter, is referred to as PAT) and a production process thereof, and in particular, the invention relates to a PAT foamed material capable of being used as building materials such as floor materials, wainscots, etc., a furniture such as shelves, desks, tables, etc., and electric housing materials and a production process thereof.

BACKGROUND OF THE INVENTION

As structural materials having a high mechanical strength, irons or lumbers have been used for a long time. However, iron has a disadvantage of becoming rusty and a lumber has a disadvantage of being liable to corrode. Thus, synthesis resins have been used in place of the aforesaid materials.

In the case of making a light weight structural material using a synthetic resin, it has bee conducted to form a foamed material by foaming a synthetic resin. As a foamed material for structural materials, a polystyrene resin, a polyethylene resin, or a vinyl chloride series resin has hitherto been used as the material therefor.

However, these materials are poor in heat resistance and also the strength thereof is relatively weak.

For solving the aforesaid problems, it is proposed to laminate a layer of a thermosetting resin layer such as a resorcinol series resin, etc., reinforced with fibers on one or both surfaces of a foamed material of a synthetic resin as a base material as described in JP-A-1-156051 (the term "JP-A" as used herein means an "unexamined published Japanese patent application"). Also, in the proposed technique, a foamed material of polystyrene or a soft polyurethane is used as the foamed material of a synthetic resin. However, since the foamed material is originally soft or even if the foamed material is hard, the material is softened at about 100° C., and also in the case of using a thermosetting resorcinol series resin, it is usually required to heat it to a temperature of at least 100° C. while pressing for forming the layer of the resin, then by the aforesaid proposal, it is impossible to adhere the fiber-reinforced resin layer to the surface(s) of the foamed material while keeping the original form of the foamed material. Accordingly, a tough and lightweight synthetic resin structural material can not be obtained by the aforesaid proposal.

Also, a foamed material of PAT (thermoplastic polyester resin) is known. PAT is known as engineering plastics and has a large toughness, a good shape stability, and an excellent heat resistance capable of enduring 200° C. Furthermore, since PAT is a thermoplastic resin, it may be considered that a foamed material of PAT can be easily obtained only by mixing a foaming agent with PAT and extruding the mixture through an extruding machine.

However, it is not easy to foam PAT different from polystyrene and polyethylene since PAT does not show a suitable viscosity for foaming at melting. The reason is that since PAT is a crystalline resin, when PAT is heated, PAT is suddenly softened to become a liquid having a low viscosity. Thus, PAT has a narrow temperature range suitable for foaming, whereby it is difficult to keep it at a temperature suitable for foaming, and since the viscosity of PAT is low, gases acting as foaming agent are immediately scattered and lost.

Thus, various attempts of easily producing foamed materials of PAT have been made.

For example, JP-B-56-8858 (the term "JP-B" as used herein means an "examined published Japanese Patent application") or U.S. Pat. No. 4,462,947 proposes that PAT is mixed with a polycarbonate resin and the mixture is heated to a temperature of from 150° C. to 250° C. to generate carbon dioxide, whereby a foamed material of PAT is formed. However, since the foamed material thus obtained contains a polycarbonate resin, the foamed material is soft and pliable, and hence is not suitable as a structural material.

Also, JP-B-61-48409 proposes that the PAT is mixed with a diglycidyl ester and the mixture is foamed by extruding. However, the aforesaid patent publication shows only that a foamed material is obtained at a high expansion ratio of 15 times but any properties of the foamed material obtained are not clarified.

JP-B-61-484410 teaches that a PAT composition shall be foamed by extruding on considering the crystallizing speed of PAT. However, the method is limited to the case of obtaining strings having a sectional area of from 1 mm$^2$ to 200 mm$^2$ and also since the patent describes that the strings obtained can be easily drawn and heat-worked, it is clear that the invention of the aforesaid patent does not aim at a structural material.

Also, JP-B-61-484411 teaches that a PAT composition shall be foamed by extruding under the condition that the crystallinity of PAT becomes at least 30%. However, the method is also limited to the case of obtaining strings having sectional area of 1 mm$^2$ to 200 mm$^2$ as in the aforesaid patent and it is described that it is required to increase the crystallinity and the strings obtained can be easily bent and they can be easily knitted and woven. Thus, the teachings of the aforesaid patent is useless for the production of structural materials.

As described above, it is known that PAT is a crystalline resin and PAT having a different crystallinity is obtained according to the manner of producing the resin. Also, it is known that as PAT having a larger crystallinity is used, a foamed material having larger roughness and heat resistance is obtained. Accordingly, it has only been attempted to obtain foamed materials having a large crystallinity.

Also, it is known that the crystallinity of PAT can be generally measured by the density, X-ray diffraction patterns, nuclear magnetic resonance spectra, etc., of the PAT resin. However, since a foamed material of PAT contains a large number of small bubbles therein, the crystallinity thereof can not be measured by these methods. Accordingly, the crystallinity of a foamed material of PAT was discussed but the method which could practically measure the crystallinity thereof was indistinct.

SUMMARY OF THE INVENTION

The inventor has paid special attention to the characteristics of PAT that PAT is enriched with rigidity and toughness, has an excellent mechanical strength, has a good dimensional stability, and is also enriched with heat resistance as well as to that PAT has a good adhesive property to a thermosetting resin and has investigated to obtained a light-weight structural material which is enriched with a heat resistance and a toughness, and is reluctant to be corroded by foaming PAT to form a light-weight foamed material. The present invention has been made as the result of the investigations.

That is, an object of this invention is to provide a foamed material of PAT capable of being used as a structural material having an excellent mechanical strength such as a bending strength, etc., by controlling the crystallinities in the surface portion and the central portion of the foamed material of PAT.

Also, other object of this invention is to provide PAT foamed material which is used as a structural material capable of being nailed by lowering the crystallinity of the surface portion of the PAT foamed material than that of the central portion thereof.

A further object of this invention is to provide a process of producing a PAT foamed material which can be used as a structural material having an excellent mechanical strength or a structural material capable of being nailed.

Other object of this invention is to provide a PAT foamed material capable of being used as a structural material having an excellent mechanical strength by laminating a thermosetting resin reinforced with fibers on the surface of the PAT foamed material.

A still other object of this invention is to provide a PAT foamed material capable of being used as a light-weight structural material having an excellent mechanical strength by laminating a foamed thermosetting resin reinforced with fibers on the surface of the PAT foamed material.

The inventors have confirmed that by a method of utilizing the thermal characteristics of PAT, the crystallinity of PAT can be accurately measured to an order of less than 1%.

In this invention, the method of utilizing the thermal characteristics of the PAT foamed material is a method of measuring the melting heat quantity and the heat quantity of the cool crystallization of the PAT foamed material.

The principle is that when a PAT foamed material is heated and the temperature of the PAT foamed material teaches the crystallizing temperature, the crystals thereof are grown, when the PAT foamed material is further heated, the formed material is melted at the melting point of the crystal, and in this case, it is utilized that the foamed material generates heat at growing the crystal and absorbs heat at melting. Practically, the heat quantity of cool crystallization generating at the crystallization at temperature raising and the melting heat quantity absorbed at melting are measured and then the crystallinity is calculated by comparing the values thus obtained with the melting heat induced from the theory of complete crystal.

On the other hand, the inventor has attempted to form a PAT foamed material by mixing PAT with a foaming agent and by extruding the mixture from an extruding machine in a molten state, and it has been confirmed that in this case, when the mixture is foamed with the addition of additives such as a foaming aid, etc., to the mixture by extruding the mixture in a high-temperature molten state, a foamed material having a thickness of at least 3 mm and an apparent density of from about 0.05 to 0.7 g/cm$^2$ is obtained. In this case, the foamed material is produced by utilizing the behavior of the crystal at lowering the temperature of PAT in the course of cooling it from the molten state to a normal temperature state.

Also, it has been confirmed that such a foamed PAT has an excellent mechanical strength and is suitable as a structural material.

Furthermore, the inventor investigated various cooling methods for the PAT foamed material directly after being extruded and also the properties of the PAT foamed materials thus obtained. As the results thereof, it has been discovered that when, in this case, the crystallinity of the surface portion of the PAT foamed material is kept at a low value, a PAT foamed material having a large bending strength and mechanical strength, and being excellent as a structural material is obtained in PAT foamed materials obtained by forming at a same expansion ratio. This is utterly astonishing on considering the conventional intention of obtaining the foamed material having a high rigidity by increasing the crystallinity.

Also, the inventor has found that when the resin constituting a foamed material is polystyrene or soft polyurethane, the foamed material is heated for curing a resorcinol series resin, the formed material is deformed and can not keep the original form but when a thermoplastic polyester resin is used as the resin of constituting a foamed material, even when the foamed material is heated to a temperature of curing a resorcinol series resin or other thermosetting resin, the foamed material is not deformed.

Furthermore, the inventor has found that when an uncured material of not only a resorcinol series resin but also other general thermosetting resin is brought into contact with the surface of a PAT foamed material and the thermosetting resin is cured by heating, the thermosetting resin fits to the unevenness formed by the foams on the surface of the foamed material and the thermosetting resin strongly adheres to the PAT foamed material.

Still further, it has also been discovered that when reinforcing fibers such as glass fibers, etc., are incorporated in the thermosetting resin, the molding obtained is reinforced by the fibers to provide a tough molding.

Even further, it has been discovered that when a fiber-containing thermosetting resin is foamed, synthetic resin-made structural materials which are lighter in weight, excellent in heat insulation, and high in strength are obtained.

The present invention has been accomplished based on the aforesaid various knowledges.

That is, according to this invention, there is provided a thermoplastic polyester series resin foamed material having a thickness of at least 3 mm and an apparent density of from 0.05 to 0.7 g/cm$^3$, wherein the crystallinity of the resin in the surface portion within 0.5 mm from the surface of the foamed material is not more than 30% and is at least 1% lower than the crystallinity of the resin in the central portion of the foamed material.

Also, according to other embodiment of this invention, there is provided a process of producing the aforesaid thermoplastic polyester series resin foamed material, which comprises extruding a thermoplastic polyester series resin containing a foaming agent from an extruding machine in a molten state of at least 200° C. and while the extruded resin is foamed and has a surface temperature of at least the crystal melting point, bringing the surface of the foamed material into contact with a light or a solid having a temperature of lower than the glass transition point of the resin to forcibly suddenly cool the resin.

According to a still other embodiment of this invention, there is further provided a synthetic resin structural material formed by bringing at least the surface of the thermoplastic polyester series resin foamed material (PAT foamed material) into contact with an uncured thermosetting resin containing fibers and then curing the thermosetting resin.

According to another embodiment of this invention, there is also provided a synthetic resin structural material formed by bringing at least the surface of the surface of the PAT foamed material into contact with an uncured thermosetting resin containing fibers and a foaming agent and forming and curing the thermosetting resin to unify them.

BRIEF DESCRIPTION OF THE DRAWING

FIG. 1 is an enlarged sectional view showing an example of the PAT foamed material of this invention.

DETAILED DESCRIPTION OF THE INVENTION

Then, the invention is described in detail. In this invention, a thermoplastic polyester series resin (i.e., PAT) is used. PAT is a high molecular weight chain polyester obtained by reacting an aromatic dicarboxylic acid with a dihydric alcohol.

As the dicarboxylic acid, terephthalic acid is most frequently used but isophthalic acid or 2,6-naphthalenedicarboxylic acid can be also used. Furthermore, diphenyl ether dicarboxylic acid, diphenylsulfondicarboxylic acid, and diphenoxydicarboxylic acid can be also used.

On the other hand, as the dihydric alcohol, ethylene glycol is mainly used but trimethylene glycol, tetramethylene glycol, neopentylene glycol, hexamethylene glycol, cyclohexanedimethylol, trichlorodecanedimethylol, 2,2'bis(4-$\beta$-hydroxyethoxyphenyl)propane, 4,4'-bis($\beta$-hydroxyethoxy)diphenylsulfone, or diethylene glycol can be also used.

Specific examples of PAT are polyethylene terephthalate, polybutylene terephthalate, a polybutylene terephthalate elastomer, polycyclohexane terephthalate, and polyethylene naphthalate.

Such PAT is commercially available and such a commercially available PAT can be used in this invention.

Since PAT is a resin which is liable to be hydrolyzed at a high temperature, in the case of foaming the resin, it is desirable to previously dry the resin. For drying the resin, for example, a dehumidifying dryer is preferably used. In the drying condition in the aforesaid case, air having a dew point of, e.g., $-30°$ C. is heated to 160° C. and PAT can be dried by exposing PAT to the air for about 4 hours.

As a foaming agent for foaming PAT, various foaming agents can be used in this invention. They can be generally classified into a solid compound which is decomposed at a temperature of higher than the softening point of PAT to generate a gas, a liquid which is vaporized in PAT by heating, and an inert gas capable of dissolving PAT under pressure. The materials classified as above can be all used in this invention.

These foaming agents are described in more detail. Examples of the aforesaid solid compound are azodicarbonamide, dinitrosopentamethylenetetramine, hydrazocarbonamide, and sodium hydrogencarbonate. Examples of the aforesaid liquid being vaporized in PAT are saturated aliphatic hydrocarbons such as hexane, n-pentane, n-butane, isobutane, etc. "saturated alicyclic hydrocarbons such as cyclohexane etc.; and halogenated hydrocarbons such as methylene chloride, Freon (trade name, made by E. I. du Pont de Nemours & Co., Ltd.), etc. Also, examples of the aforesaid inert gas are carbon dioxide, nitrogen, etc.

In this invention, it is required to foam PAT containing a foaming agent by extrusion. For the purpose, PAT containing a foaming agent is previously prepared and the mixture may be extruded by an extruding machine or a foaming agent may be incorporated in PAT in an extruding machine.

A mouthpiece having an extrusion hole or slit is equipped to the end of the extruding machine and PAT containing a foaming agent is extruded through the extruding hole or slit.

In this case, the extrusion temperature of PAT is a high temperature as 200° C. or higher for forming a molten state of PAT. That is, PAT is extruded at the temperature of melt-kneading PAT and a foaming agent or at a high temperature of slightly lower than the aforesaid temperature. Practically speaking, when polyethylene terephthalate (hereinafter, is referred to as PET) is used as PAT, PET is melt-kneaded with a foaming agent at 280° C. and by extruding the mixture from a extruding machine at 280° C. as it was, a foamed material having a density of from 0.05 to 0.7 g/cm$^3$ can be obtained. Also, polybutylene terephthalate (hereinafter, is referred to as PBT) is used as PAT, PBT is melt-kneaded with a foaming agent at 260° C., PBT is extruded from an extruding machine at 240° C., i.e., 20° C. lower than the melt-kneading temperature to provide a foamed material having the aforesaid density.

It is unexpectedly that PAT is extruded such a high temperature. This is because such a high temperature is not a temperature at which PAT shows a particularly suitable viscosity for foaming PAT and such a high temperature is not employed for other resins. That is, in the case of other resin such as, for example, polyethylene, the resin is melt-kneaded with a foaming agent at 220° C. and it is required that the temperature is lowered at a temperature width of 110° C. and the resin is foamed by extruding at about 110° C. Also, in the case of polypropylene, the resin is melt-kneaded with a foaming agent at 250° C. and it is required that the temperature is lowered at a temperature width of 80° C. and is formed by extruding at about 170° C.

In this invention, when extruded PAT is foamed and the surface temperature of the foamed resin is at a high temperature of higher than the crystal melting point, the foamed resin is suddenly cooled. For sudden cooling the foamed resin is brought into contact with a liquid or a solid which is at a temperature of lower than the glass transition point of PAT.

The crystal melting point and the glass transition point of PAT differ according to the kinds of the carboxylic acid and the alcohol constituting the PAT but the crystal melting point of PAT is generally in the range of from 220° C. to 290° C. and the glass transition point thereof is generally in the range of from 30° C. to 90° C. Accordingly, for practicing sudden cooling, the foamed resin is usually brought into contact with a liquid or a solid which is at a temperature of lower than 60° C.

As a liquid being used for sudden cooling, water is suitable. Also, as a solid being used for sudden cooling, a metal having a good heat conductivity, such as, in particular, aluminum, stainless steel, copper, etc., is suitable. It is desirable that the solid for sudden cooling has a form the surface of which can be brought into contact well with the surface of the PAT foamed material.

For example, when PAT is extruded as a cylindrical sheet, a mandrel is used as the solid for sudden cooling, the foamed PAT cylindrical sheet is advanced along the mandrel and the mandrel is cooled by water. In this case, it is better that the length of the mandrel is as long as possible. Also, when PAT is extruded as a plate-like sheet, a pair of rolls is used as the solid for sudden cooling, the foamed PAT sheet is advanced while it is in a close contact state with the roll surfaces and the rolls are cooled with water. In this case, it is preferred that the diameter of each roll is as large as possible. Thus, the crystallinity of the surface portion of the PAT foamed material is kept low.

Since when the extruded PAT foamed material is suddenly cooled, the foamed material is solidified without a time of crystallizing, the crystallinity of the foamed material is low. In general, when an extruded material is a foamed material and the foamed material is cooled or is introduced into a mold to adjust the form thereof, the foamed material is usually not suddenly cooled. This is because if the foamed material is suddenly cooled, foams are shrinked to reduce the surface state of the foamed material. Thus, if in the case of PAT, the PAT foamed material is not suddenly cooled as in the conventional technique, the crystallization occurs at the surface to increase the crystallinity to usually about 30%. Also, in a foamed material having a thick thickness, the central portion thereof can not be suddenly cooled, which results in increasing the crystallinity thereof. On the other hand, in this invention, when the surface of the PAT foamed material is at a temperature of above the crystal melting point, the surface is brought into contact with a liquid or a solid which is at a temperature of lower than the glass transition point of the PAT foamed material to suddenly cool, whereby the crystallinity can be kept low.

In this invention, it is necessary that the portion having the crystallinity of not more than 30% is the surface portion of the PAT foamed material.

The term "surface portion" in this invention means the portion within 0.5 mm (perpendicular to the surface) from the surface of the foamed material. Also, the term "central portion" means the portion excluding the portion within 1.0 mm (perpendicular to the surface) from the surface of the foamed material.

The crystallinity of a PAT foamed material is practically measured as follows.

For example, in the case of measuring the crystallinity of the surface portion of a PAT foamed material, the portion of 0.5 mm in depth from the surface of the PAT foamed material is teared off and then the heat quantity of the cool crystallization and the melting heat quantity of the portion as a sample are measured. It is desirable that the measurement is made by a differential scanning heat quantity measuring method.

In the differential scanning heat quantity measuring method, heaters for the sample being measured and a standard sample function independently and since if a temperature difference occurs between both the samples during heating at a constant rate, the heat quantity increasing or restraining mechanism of either of them acts to negate the temperature difference, the difference of the heat stream rates is directly recorded.

The crystallinity is theoretically calculated by the following formula:

$$Crystallinity\ (\%) = (A)/(B) \times 100$$

(A): Melting heat quantity per mol - heat quantity of cold crystallization per mol.
(B): Melting heat quantity per mol of complete crystal PAT.

In this case, according to *Koobunshi (Polymer) Data Handbook*, (published by Baifuukan), the melting heat quantity of complete crystal polyethylene phthalate is 26.9 KJ and the value is used in this invention.

In this invention, the surface of the PAT foamed material extruded is suddenly cooled to hold the crystallinity of the surface portion thereof not more than 30%. In this case, the inside of the foamed material is not suddenly cooled by the existence of foams and is gradually cooled, whereby the crystallinity of the inside is usually higher than that of the surface portion. In this invention, it is necessary that the crystallinity of the surface portion of the PAT foamed material is at least 1% lower than the crystallinity of the central portion. Furthermore, it is more preferred that the crystallinity of the surface portion is at least 1.5% lower than that of the central portion.

In the PAT foamed materials of this invention, the whole mean crystallinity of the preferred foamed materials is from 15% to 50%, and preferably from 20% to 40%. Also, it is preferable that the crystallinity of the surface portion of the PAT foamed materials is from 14% to 30%.

Then, the state of an example of the PAT foamed material of this invention is shown in the accompanying drawing.

FIG. 1 shows an enlarged sectional view of a part of an example of the PAT foamed sheet of this invention.

In FIG. 1, A shows the surface portion within 0.5 mm (perpendicular to the surface) from the surface of the foamed material. Also, B shows the shell portion existing within 1 mm (perpendicular to the surface) from the surface of the foamed material. C shows the central portion of the foamed material and D shows the portion for calculating the whole mean crystallinity of the foamed material.

The surface portion A has a structure that very fine bubbles are densely distributed, the inside portion E succeeding the surface portion has a structure that bubbles coarser than the bubbles in the surface portion A are roughly distributed, and the central portion C has a structure that more coarser bubbles are more roughly distributed.

At the practice of this invention, various additives can be added to PAT. For example, small amount of a talc powder as a nulceating agent; epoxy compounds such as diglycidyl terephthalate, etc., acid dianhydrides such as pyromellitic dianhydride, benzophenonetetracarboxylic acid dianhydride, cyclopentanetetracarboxylic acid dianhydride, diphenylsulfonetetracarboxylic acid dianhydride, etc., and compounds of metals belonging to groups Ia and IIa of the periodic table or sodium carbonate for improving the melting characteristics of PAT can be added singly or as a mixture thereof. The amount of the additives is selected in the range of from 0.1 to 5 parts by weight to 100 parts by weight of PAT.

Also, in this invention, when the foamed material obtained by extrusion-foaming the resin has a too low expansion ratio, the foamed material can be further heated to cause secondary foaming. In this case, there is no specific restriction on the heating means. That is, a heating means by conduction, a heating means by radiation, or a heating means by high frequency electric power can be used. Also, any heating medium which can immerse PAT can be used in this case.

In a preferred heating method in the aforesaid methods, the PAT foamed material obtained by extrusion-foaming is brought into contact with steam or heated water.

In the case of causing secondary foaming by bringing the foamed material into contact with steam or heated water, the foamed material can be immediately subjected to secondary foaming successive to extrusion-foaming. In this case, the temperature of steam or water is from 60° to 125° C. and the contact time is from 10 seconds to 5 minutes. If the temperature of the heating medium is over 125° C, there is a possibility that steam or water having such a high temperature hydrolyzes the PAT foamed material. Thus, it is better to avoid the employment of such a high temperature.

Also, in the structural material of this invention, as a thermosetting resin which is laminated on the PAT foamed material obtained as described above or other PAT foamed material, various kinds of resins can be used. For example, there are unsaturated polyester resins, epoxy resins, and phenol resins. These resins are in uncured states and used as a powder or a liquid.

The unsaturated polyester resin is a thermosetting resin formed by dissolving a vinylic monomer in a resin (base resin) obtained by the condensation reaction of an unsaturated or saturated dicarboxylic acid and a dihydric alcohol. The main chain of the base resin contain an unsaturated group and the unsaturated group causes a copolymerization reaction with the vinylic monomer to cause crosslinking and curing. As the dicarboxylic acid, maleic anhydride or phthalic anhydride is frequently used, as a dihydric alcohol, ethylene glycol or propylene glycol is used, and as a vinylic monomer, styrene is used. The uncured resin is obtained as a powdery material or a liquid having a low viscosity.

When an organic peroxide such as benzoyl peroxide is added to the unsaturated polyester resin and the mixture is heated, the resin is cured to form a solid resin. In this case, when a curing accelerator such as dimethylaniline and cobalt naphthenate is added to the system, the resin is cured without need of heating. Also, the resin forms a layer without pressing.

The aforesaid epoxy resin is a resin having two or more epoxy groups in the molecule. The resin is classified into various types such as bisphenol A type resins, alicyclic resins, and resins induced from polybutadiene but in these resins, bisphenol A type resins are frequently used. The bisphenol A type resins are generally shown by the following formulae;

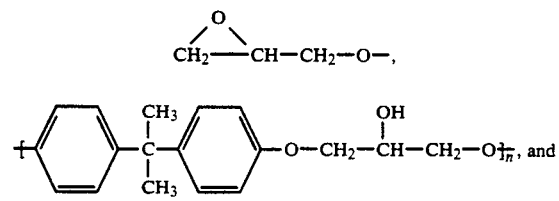

-continued

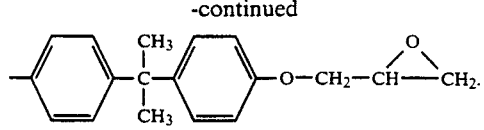

wherein n represents an integer of from 0 to 12. According to the number of n, the resins take various states from liquid to solid. They are uncured epoxy resins.

When a curing agent is added to the uncured epoxy resin, the resin is cured to form a solid resin. As the curing agent, an aliphatic diamine, an aromatic diamine, an aromatic acid anhydride, an aliphatic polyamine, etc., can be used.

When an aliphatic polyamine is added to the uncured epoxy resin, the resin can be cured at normal temperature without need of heating, while when an aromatic diamine or an aromatic acid anhydride is added to the uncured epoxy resin, the resin is cured by heating. The resin may be cured by applying pressure or may be cured at normal pressure without applying pressure.

The phenol resin is a resin formed by the reaction of phenol and formaldehyde. According to the kind of catalyst being used for the reaction, two kinds of resins each having a different chemical structure are obtained. That is, the phenol resin obtained by using an alkali as the catalyst is called "resol" and the phenol resin obtained by using an acid as the catalyst is called "novolak". Resol is initially in a liquid state but when resol is heated, it becomes a solid state. Novolak is a brittle solid and when hexamethylenetetramine is added thereto as a curing agent and the mixture is heated, novolak is cured to form a solid resin.

In other embodiment of this invention, fibers are used for reinforcing the thermosetting resin. As the fibers, there are glass fibers, carbon fibers, aromatic polyamide fibers, metal fibers, potassium titanate fibers, silicon carbide fibers, etc. The diameters of the fibers are from several microns to several tens microns and fibers having various lengths can be used according to the requirement. Also, the state of the fibers may be single fiber or may be yarn, strand, roving, chopped strand, mat, cloth, etc.

The uncured thermosetting resin containing fibers can be easily prepared by mixing the fibers and the resin.

When an unsaturated polyester resin is used as the thermosetting resin, the resin generally called "sheet molding compound" and generally abbreviated as "SMC" can be used as it is.

The structural material of this invention can be prepared by bringing the uncured thermosetting resin containing fibers into contact with the surface of a PAT foamed material and thereafter curing the resin.

It is unnecessary to use a specific adhesive on the foamed material for laminating the thermosetting resin. In this case, however, when heating is required for curing the thermosetting resin, the resin is heated and also when pressing is required, the laminate formed is pressured in a press. However, since the PAT foamed material is not usually softened at a temperature lower than 200° C. and hence when the laminate is heated for curing the thermosetting resin, the foamed material is not deformed. Also, since the PAT foamed material is scarcely deformed even by applying thereto a slight pressure, the foamed material is scarcely deformed even when the laminated is pressed for curing the thermosetting resin. If the laminate of the foamed material and the thermosetting resin is strongly pressed, the PAT foamed material causes an elastic deformation only and does not lose the foamed structure.

Thus, a structural material composed of the fiber containing thermosetting resin and the PAT foamed material in a unitary body can be easily and surely prepared.

The fiber-containing thermosetting resin can be formed at one surface of the PAT foamed material but may be formed on both the surfaces of the PAT foamed material to provide a sandwich structure of inserting the PAT foamed material between two sheets of the fiber containing thermoplastic resin.

In a still other embodiment of this invention, for foaming the thermosetting resin, a foaming agent is added to the resin while the resin is in an uncured state and the resin is foamed and cured. In this case, various kinds of materials can be used as the foaming agent. The foaming agent being used for the thermosetting resin is generally classified into a solid compound which is decomposed at a temperature of higher than the curing temperature of the resin to generate a gas and a liquid or a gas which is dissolved in the resin at a temperature of lower than the curing temperature of the resin but is vaporized in the resin when the temperature becomes higher than the curing temperature of the resin.

Examples of the aforesaid solid compound are 2,2'-azoisobutyronitrile, diazoaminobenzene, and tetraphthalazide and also examples of the aforesaid liquid or gas are petroleum ether and acetone.

The uncured thermosetting resin containing fibers and a foaming agent can be easily prepared by mixing the resin with the fibers and the foaming agent. When an unsaturated polyester resin is used as the thermosetting resin, a mixture of a resin called "sheet molding compound" and generally abbreviated as "SMC" and a foaming agent impregnated therein can be used as it is.

The aforesaid structural material of this invention can be prepared by bringing the thermosetting resin containing fibers and a foaming agent into contact with the surface of the PAT foamed material, forming a space capable of foaming the resin in the direction perpendicular to the contact surface between the PAT foamed material and the thermosetting resin, and only heating the resin. In this case, as the crystallinity of the surface portion of the PAT foamed material is lower, the adhesion between the foamed material and the thermosetting resin is better. Anyhow, in this case, it is unnecessary to use a specific adhesive on the foamed material. If it is required to press the laminate for adjusting the form at curing the thermosetting resin, the laminate is pressed in a press. In this case, however, since the PAT foamed material is not usually softened at a temperature of lower than 200° C., the foamed material is not deformed at heating for curing the thermosetting resin. Also, since the PAT foamed material is scarcely deformed by the application of a slight pressure, the foamed material is scarcely deformed when a pressure is applied at curing the thermosetting resin. Also, even when the laminate is strongly pressed, the PAT foamed material causes an elastic deformation only and does not lose the foamed structure.

Thus, a structural material wherein the fiber-containing foamed thermosetting resin and the PAT foamed material are laminated in a unitary body can be easily and surely prepared.

In this embodiment, the fiber-containing foamed thermosetting resin may be formed on one surface of the PAT foamed material but may be farmed on both the surfaces of the PAT foamed material to form a sandwich structure that the PAT foamed material is inserted between two sheets of the fiber-containing foamed resin.

Now, since the PAT foamed material of this invention has a thickness of at least 3 mm, preferably from 3 to 50 mm, and an apparent density of from 0.05 to 0.7 g/cm$^3$, the PAT foamed material has sufficient strength and heat resistance and further is light-weight. Furthermore, since in the PAT foamed material, the crystallinity of the surface portion within 0.5 mm from the surface of the foamed material is held low as not more than 30% and also is at least 1% lower than the crystallinity of the central portion of the foamed material, the PAT foamed material has a high bending strength and a high nail pulling out strength. The nail pulling out strength is the resisting power in the case of pulling out a nail after nailing. The high nail pulling out strength means that the nail is reluctant to be pulled out, which is suitable for a construction work. Thus, the PAT foamed material of this invention is suitable as a structural material.

Also, according to the process of this invention, PAT containing a foaming agent is extruded from an extruding machine in a molten state of a temperature of at least 200° C., PAT is foamed at a low expansion ratio and a PAT foamed material having an apparent density of from 0.05 to 0.7 g/cm$^3$ can be easily obtained. Also, since while extruded PAT is foamed and has a surface temperature of higher than the crystal melting point, the surface of the PAT foamed material is brought into contact with a liquid or a solid having a temperature of lower than the glass transition point of PAT to forcibly suddenly cool the surface, the surface of the PAT foamed material is solidified without a time for crystallizing, whereby the crystallinity of the surface is lowered. Thus, a PAT foamed material having the crystallinity of the surface portion of at least 1% lower than the crystallinity of the central portion of the foamed material can be easily obtained. As the result thereof, the foamed material having high bending strength (e.g., 50 to 100 kg·f/cm$^2$) and nail pulling out strength (e.g., 9.5 to 25.0 kg·f) as well as having a sufficient strength and heat resistance and having light weight is obtained.

Accordingly, the foamed material is suitable for use as a structural material. The process of this invention gives large industrial advantages in the point of easily making the aforesaid structural material.

Also, in this invention, PAT is used as the material for forming the foamed material and PAT has a high heat resistance such that PAT is not softened at a temperature lower than 200° C., thereby even when a thermosetting resin is cured on the surface of the foamed material, the foamed material does not lose the foamed structure and hence the layer of the thermosetting resin can be directly formed on the foamed material. Furthermore, in this case, the surface of the foamed material is uneven based on the existence of bubbles and hence the thermosetting resin strongly adhere to the foamed material, whereby the product obtained is reluctant to be peeled off.

Also, in an embodiment of this invention, the thermoplastic resin contains fibers, the product is reinforced by the fibers and has a sufficient mechanical strength. Furthermore, for making the aforesaid product or laminate, a specific adhesive is not required and hence the production thereof is easy.

Moreover, since the product thus produced contains the PAT foamed material, the product is light weight and has a high heat resistance. Furthermore, since setting resin have sufficient heat resistance and mechanical strength, the whole product is light-weight and has high heat resistance and high mechanical strength. Accordingly, the product is suitably used as a structural material for motor cars, airplanes, ships, etc.

Also, in another embodiment of this invention, PAT is used as the material for the foamed material and since PAT has a heat resistance that the foamed material is not softened at a temperature of up to 200° C., when the thermosetting resin is foamed and cured on the surface of the foamed material, the foamed material does not lose the foamed structure and hence the layer of the thermosetting resin can be directly formed on the foamed material. Furthermore, in this case, since the surface of the foamed material is uneven based on the existence of bubbles, the thermosetting resin strongly adhere to the foamed material and thus, the product obtained is reluctant to be peeled off. Also, in this case, since the thermosetting resin contains fibers, the product is reinforced by the fibers and has a sufficient mechanical strength. Furthermore, for making the product, a specific adhesive is not required and hence the production thereof is easy. Moreover, since the thermoplastic resin and PAT are foamed, the product is light-weight and has a high heat resistance. Also, since the PAT foamed material and the fiber-containing thermosetting resin have sufficient heat resistance and mechanical strength, the whole product is light-weight and has high heat resistance and mechanical strength. Thus, the product is also suitable as a structural material for motor cars, airplanes, ships, etc.

Then, the invention is described more practically by the following examples, wherein parts are by weight.

In the examples, the bending strength and bend-flexed amount were measured according to JIS K 7203. The measurement conditions are as follows. In Examples 1 to 5 and Comparison Examples 1 and 2, the bending rate is 10 mm/min, the distance between supporting points is 70 mm, the width of a sample is 15 mm, and the thickness of a sample is the thickness of the original sample.

In Examples 6 to 12 and Comparison Examples 3 to 6, the bending rate is 2.5 m/min., the distance between the supporting points is 80 mm, the width of a sample is 30 mm, and the thickness of a sample is the thickness of the original sample.

Also, a nail pulling off strength is the value measured as follows.

As a nail, a wire nail having a length below a head of 49 mm and an outside diameter of 2.5 mm was used, the nail was hold perpendicularly on the surface of a PAT foamed sheet, the nail was nailed to a depth of 15 mm from the surface by an oil pressure press, thereafter, the nail was pulled off from the PAT foamed sheet by using a tension test machine, and the value of maximum load (kg·f) by which the nail was pulled off under the condition of the pulling off rate of 10 mm/min. was employed as the nail pulling off strength.

EXAMPLE 1

Polyethylene terephthalate (hereinafter, as "PET") (PET 9902, trade name, made by Eastman Kodak Co.) was used as PAT.

First, PET was placed in a dehumidifying dryer and PET was dried for 4 hours at 160° C. while circulating air having a dew point of −30° C.

Then, the following mixture was prepared using aforesaid PET thus dried.

| | |
|---|---|
| PET | 100 parts |
| Talc (nucleating agent) | 0.6 part |
| Pyromellitic Anhydride | 0.5 part |
| Sodium Carbonate | 0.1 part |

The mixture was placed in an extruding machine having an aperture of 65 mm and L/D of 35, mixed well at a screw rotation number of 25 r.p.m. and at a barrel temperature of from 270° C. to 290° C., butane was pressed in the mixture as a foaming agent at an intermediate of the barrel in an amount of 1% by weight to the mixture, and the pushing out pressure was 55 kg/cm$^2$.

Thus, PET containing the foaming agent was extruded in the air of 30° C. in a tabular form from a flat die. The die had a slit width of 75 mm and an interval of 1.5 mm, and kept at 265° C. PET extruded in the air was immediately foamed. The PET foamed sheet was immediately inserted between metal plates for cooling and advanced while closing contacting the cooling metal plates. The cooling metal plates were cooled by passing water of 20° C. through the inside of each plate. Thus, a PET foamed board having a width of 180 mm and a thickness of 35 mm was obtained.

The foamed board was cut perpendicularly to the extruding direction and the section was observed. As the result thereof, a shell having a different foamed state was observed within the range of 2 mm (perpendicular o the surface) from the surface. When the properties of the foamed board were measured, the mean density was 0.35 g/cm$^3$, the density of the surface portion (thickness of 0.5 mm) was 0.38 g/cm$^3$, the density of the central portion was 0.35 g/cm$^3$, the whole mean crystallinity was 30.7%, the crystallinity of the surface portion was 26.7%, and the crystallinity of the central portion was 30.8%. Also, the bending strength thereof was 95.3 kg·f/cm$^3$, the bend-flexed amount was 2 mm, and the nailing off strength was 20 kg·f.

COMPARISON EXAMPLE 1

In the comparison example, a PET foamed board having almost the same density as that in Example 1 was prepared for comparing with the foamed board formed in Example 1 and the properties of both the foamed boards were compared.

In the comparison example, PET was foamed as in Example 1 except that the cooling metal plates were not used for forcively cooling the extruded PET foamed board and the foamed board was allowed to naturally cool in the air of 30° C.

When the foamed board was cut perpendicularly to the extruding direction and the section was observed, no shell portion was observed on the surface.

When the properties of the foamed board were measured, the mean density was 0.35 g/cm$^3$, the density of the portion corresponding the surface portion within 0.5 mm from the surface and the density of the central portion were all 0.35 g/cm$^3$, the whole mean crystallinity, the crystallinity of the portion corresponding to the shell portion, and the crystallinity of the central portion were all 30.8%. Also, the bending strength was 80.0 kg·f/cm³, the bend-flexed amount was 1.2 mm, and the nail pulling off strength was 9.5 kg·f.

On comparing the foamed board obtained in Comparison Example 1 with the foamed board obtained in Example 1, it can be seen that the foamed board of this invention (Example 1) are excellent in the bending strength and the nail pulling off strength as compared with the foamed board in the comparison example although the expansion ratio was almost same in both cases.

EXAMPLE 2

By following the same procedure as Example 1 except that the content of butane as a foaming agent was 1.8% by weight of the resin mixture and the pushing out pressure was 70 kg/cm², a PET foamed sheet was prepared.

The PET foamed sheet obtained had a width of 180 mm and a thickness of 5 mm. When the foamed sheet was cut perpendicularly to the extruding direction and the section was observed, a shell portion having a different foamed state than the central portion was observed within 1 mm (perpendicular to the surface) from the surface. When the properties of the foamed sheet were measured, the mean density was 0.22 g/cm³, the density of the surface portion was 0.24 g/cm³, the density of the central portion was 0.21 g/cm³, the whole mean crystallinity was 22.3%, the crystallinity of the surface portion (thickness of 0.5 mm) was 18.7%, the crystallinity of the central portion was 22.7%, the bending strength of 53.9 kg·f/cm², the bend-flexed amount was 12 mm, and the nail pulling off strength was 9.8 kg·f.

COMPARISON EXAMPLE 2

In the comparison example, a PET foamed sheet having almost the same density as that in Example 2 was prepared for comparing with the foamed sheet in Example 2 and the properties of the foamed sheet were compared.

In the comparison example, the PET foamed sheet was prepared by the same manner as Example 2 except that the cooling metal plates were not used and the extruded PET foamed sheet was allowed to naturally cool without forcibly cooling the foamed sheet.

When the foamed sheet was cut perpendicularly to the extruding direction and the section was observed, no shell portion was observed at the surface thereof.

When the properties of the foamed sheet were measured, the mean density was 0.22 g/cm³, the density of the portion corresponding to the surface portion within 0.5 mm from the surface and the density of the central portion were all 0.22 g/cm³ and the whole mean crystallinity, the crystallinity of the portion corresponding to the surface portion, and the crystallinity of the central portion were all 22.5%. Also, the bending strength was 41.6 kg·f/cm², the bend-flexed amount of 4.6 mm, and nail pulling off strength was 4.6 kg·f.

On comparing the foamed sheet obtained in Comparison Example 2 with the foamed sheet obtained in Example 2, it can be seen that the foamed sheet of this invention in Example 2 was excellent in the bending strength, the nail pulling off strength, and the bend-flexed amount as compared with the comparison foamed sheet although the expansion ratios (densities) of them were almost same.

EXAMPLE 3

By following the same procedure as Example 2 except that the extruded foamed sheet was cooled by immersing in water of 35° C. in place of using the cooling metal plates, a PET foamed sheet was prepared.

The foamed sheet obtained had a width of 180 mm and a thickness of 5 mm. When the foamed sheet was cut perpendicularly to the extruding direction and the section was observed, a shell portion having a different foamed state from that of the central portion was observed within 1 mm (perpendicular to the surface) from the surface. When the properties of the foamed sheet were measured, the mean density was 0.22 g/cm³, the density of the surface portion was 0.24 g/cm³, the density of the central portion was 0.21 g/cm³, the whole mean crystallinity was 22.1%, the crystallinity of the surface portion was 18.5%, the crystallinity of the central portion was 22.6%, the bending strength was 50.2 kg·f/cm², and the nail pulling off strength was 9.3 kg·f.

EXAMPLE 4

By following the same procedure as Example 1 except that the screw rotation number was changed to 45 r.p.m., n-pentane was used as a foaming agent in an amount of 4% by weight of the resin mixture, and the pushing out pressure was changed to 120 kg/cm³, a PET foamed plate was prepared. The foamed plate obtained had a width of 185 mm, a thickness of 20 mm, and a mean density of 12 g/cm³.

The foamed plate was contact-heated with steam of 100° C. for 5 minutes to cause secondary foaming and immediately cooled by placing the foamed plate between two cooling metal plates kept at 20° C. The thickness of the foamed board obtained by the secondary foaming was 52 mm.

When the foamed board was cut perpendicularly to the extruding direction and the section was observed, a shell portion having a different foamed state from that of the central portion was observed within 1.5 mm (perpendicular to the surface) from the surface. When the properties of the foamed board were measured, the mean density was 0.05 g/cm³, the density of the surface portion (thickness of 0.5 mm) was 0.056 g/cm³, the density of the central portion was 0.049 g/cm³, the whole mean crystallinity was 26.3%, the crystallinity of the surface portion was 23.4%, and the crystallinity of the central portion was 26.7%. Also, the bending strength was 15.6 kg·f/cm² and the nail pulling off strength was 5.2 kg·f.

EXAMPLE 5

Polybutylene terephthalate (hereinafter, is referred to as PBT) (XD478, trade name, made by Polyplastic Co.) was used as PAT. First, PBT was placed in a dehumidifying dryer and dried for 4 hours at 130° C. while circulating air having a dew point of −30° C.

Then, the following mixture was prepared using the aforesaid PBT.

| | |
|---|---|
| PBT | 100 parts |
| Talc (nucleating agent) | 0.6 part |
| T6-5 (trade name of higher fatty acid ester, made by Kao Corporation) | 0.5 part |

The mixture was placed in an extruding machine having an aperture of 65 mm and L/D of 35, mixed well at a screw rotation number of 25 r.p.m., and barrel temperature of from 235° to 265° C., butane was pressed in as a foaming agent from a middle portion of the barrel in an amount of 1% by weight of the mixture and the mixture was extruded at a pushing out force of 50 kg/cm$^2$.

Thus, PBT containing the foaming agent was extruded from a flat die into the air of 30° C. in a tabular form. The die has a slit width of 75 mm, a distance of 1.5 mm, and kept at 225° C. PBT extruded in the air foamed immediately. The foamed PBT sheet was immediately place between cooling metal plates and advanced while contacting with the cooling metal plates. The cooling metal plates were cooled by passing water of 15° C. through the inside of each metal plate. Thus, a PBT foamed sheet having a width of 130 mm and a thickness of 5 mm was obtained.

When the foamed sheet was cut perpendicularly to the extruding direction and the section was observed, a shell portion having a different foamed state from that in the central portion was observed within 1 mm (perpendicular to the surface) from the surface. When the properties of the foamed sheet were measured, the mean density was 0.17 g/cm$^3$, the density of the surface portion (thickness of 0.5 mm) was 0.19 g/cm$^3$, the density of the central portion was 0.17 g/cm$^3$, the whole mean crystallinity was 24.3%, the crystallinity of the surface portion was 22.7%, the crystallinity of the central portion was 24.8%. Also, the bending strength was 57 kg·f/cm$^2$ and the nail pulling off strength was 16 kg·f.

EXAMPLE 6

As PET, 100 parts of polyethylene terephthalate pellets having an intrinsic viscosity of 0.81 (TR 8580, trade name, made by Teijin Limited) were used, after drying the pellets for 5 hours with hot blast of 160° C. having a dew pint of −20° C., 0.3 part of pyromellitic anhydride, 0.1 part of sodium carbonate (both components were viscosity controlling agent of PET), and 0.6 part of a talc powder (bubble controlling agent) were added to the pellets, and after mixing well the resultant mixture in a tumbler, the mixture was placed in an extruding machine.

The cylinder temperature of the extruding machine was from 274° C. to 287° C. and the mouthpiece temperature thereof was 277° C. Also, butane was pressed in from an intermediate portion of the cylinder as a foaming agent in an amount of about 1.0 part.

To the end of the extruding machine was equipped a mouthpiece having an annular slit, PAT containing butane was extruded through the annular slit as a cylindrical form, and cylindrical sheet thus extruded was advanced on a cylindrical mandrel while foaming PET to form a cylindrical foamed sheet.

Thereafter, the cylindrical foamed sheet was cut open to form a flat sheet and the sheet was wound into a roll.

The foamed sheet obtained had a density of 0.262 g/cm$^3$, a thickness of 1.45 mm, and a width of 640 mm. (Fiber-containing thermosetting resin)

As a fiber-containing thermosetting resin, SMC (DIC MAT 2454A, trade name, made by Dainippon Ink and Chemicals, Inc.) was used.

Production of Structural Material

The PET foamed sheet of 200 mm square was placed between the sheets of aforesaid SMC of 150 mm square and the assembly was placed in a mold frame. The mold frame was prepared by punching a regular square having on side length of 200 mm in a regular square metal plate having a thickness of 2 mm and one side length of 250 mm and was composed of a square frame having a width of 25 mm. The aforesaid assembly was placed in a press together with the mold frame and heated to 150° C. for 5 minutes while applying a pressure of 30 kg/cm$^2$. Thus, a structural material was obtained.

The structural material had a thickness of 2.7 mm and a density of 1.17 g/cm$^2$. The reason that the thickness of the structural material become larger than the thickness of the mold frame was that the PAT foamed material was further foamed when it is taken out from the press.

The bending strength of the structural material measured according to JIS K 7203 was 9.64 kg·f in bending load and 14.6 mm in the flexed amount. Also, when it was tried to peel off SMC from the PAT foamed material at the interface, SMC could not be easily peeled off and when SMC was forcibly peeled off, the PET foamed material was broken.

EXAMPLE 7

On both surfaces of the PET foamed material prepared by the same manner as Example 6 were placed 150 mm square of a glass fiber mat (FEM-300-04, trade name, made by Fuji Fiber Glass Co.) having 300 g in weight per 1 m$^2$ (basis weight), 52 g of a phenol resin (PF-0015m trade name, made by Asahi Yuuki Zai K,K., viscosity 5300 cp/35° C.) and 4 g of a curing agent (AD-14, trade name, made by the aforesaid company) and the laminate was placed in a mold frame.

The mold frame was made by punching a regular square having one side length of 150 mm in a regular square metal plate having a thickness of 5 mm and a one side length of 180 mm and was composed of square frame having a width of 15 mm. The aforesaid laminate (assembly) was placed in a press together with the mold frame and heated to 80° C. for 30 minutes while applying a pressure of 30 kg/cm$^2$ to provide a structural material.

The structural material had a thickness of 5.8 mm and a density of 0.88 g/cm$^3$. When the bending load was measured as in Example 6, the bending load was 27.7 kg·f and the flexed amount was 6.9 mm.

When it was tried to peel off the laminate at the interface, the laminate could not be peeled off until the PET foamed material was broken, which showed a very good adhere.

COMPARISON EXAMPLE 3

When the same procedure as Example 6 was followed except that a heat-resisting polystyrene foamed material having a basis weight of 200 g and a thickness of 1.85 mm was used in place of the PET foamed material, the polystyrene foamed material was melted and had no trace of the original form.

COMPARISON EXAMPLE 4

When the same procedure as Example 6 was followed except that a polypropylene resin foamed sheet having a basis weight of 567 g and a thickness of 0.7 mm was used in place of the PET foamed material, any deformation of the polypropylene resin foamed sheet was not observed but the adhesion at the interface was poor and the laminate was easily peeled off.

COMPARISON EXAMPLE 5

When the same procedure as Example 7 was followed except that a polystyrene foamed sheet having a basic weight of 200 g and a thickness of 1.85 mm was used in place of the PET foamed material, any deformation of the polystyrene resin foamed layer was not observed but the adhesion at the interface was poor and the laminate was easily peeled off.

EXAMPLE 8

As PET, 100 parts of polyethylene terephthalate pellets having an intrinsic viscosity of 0.81 (TR 8580, trade name, made by Teijin Limited) were used. After drying the aforesaid pellets for 5 hours with hot blast having a temperature of 160° C. and a dew point of −20° C., 0.33 part of pyromellitic anhydride, 0.1 part of sodium carbonate (both being viscosity controlling agents for PET), and 0.6 part of a talc powder (bubble controlling agent) were added to the pellets, and after mixing well the mixture in a tumbler, the mixture was placed in an extruding machine.

The cylinder temperature of the extruding machine was from 275° C. to 287° C. and the die temperature thereof was 277° C. Also, about 1.0 part of butane was pressed in the system from a middle portion of the cylinder as a foaming agent.

To the end of the extruding machine was equipped a die having an annular fine slit, PET containing butane was extruded through the annular fine slit as a cylindrical form, the cylindrical sheet was advanced along the surface of a cylindrical mandrel while foaming PET to provide a foamed cylindrical sheet. The cylindrical sheet was cut open to form a flat sheet and the sheet was wound into a roll form. The foamed sheet obtained had a density of 0.2 g/cm$^3$ and a thickness of 3 mm.

From the foamed sheet thus obtained, a regular square sheet having a one side length of 150 mm was cut to provide a PET foamed sheet.

Fiber and Foaming Agent-Containing Thermosetting resin

By uniformly impregnating 150 mm square of a glass fiber mat having a basis weight of 300 g (FEM-300-04, trade name, made by Fuji Fiber Glass K.K.) with a mixture of 30 g of a phenol resin (PF-0015, trade name, made by Asahi Yuuki Zairyo K.K., viscosity 5100 c.p./25° C.), 5 g of a curing agent (CA-645, trade name, made by the aforesaid company), and 3.6 g of a foaming agent (AA-30, trade name, made by the aforesaid company), an uncured thermosetting resin sheet containing glass fibers and a foaming agent was prepared. Two such thermosetting resin sheets were prepared.

Production of Structural Material

The aforesaid PET foamed sheet was placed between the aforesaid uncured thermosetting resin sheets containing the fibers and the foaming agent and the assembly was placed in a mold frame. The mold frame was a frame formed by punching a regular square having one side length of 150 mm at the center of a regular square metal plate having a thickness of 5 mm and a one side length of 180 mm and was a square frame having a width of 15 mm.

The laminated assembly placed in the mold frame had a space in the thickness direction of the sheet for allowing the expansion. The mold frame containing the assembly was placed in a press and heated to 90° C. for 20 minutes while applying a pressure of 40 kg/cm$^2$ to provide a structural material.

The structural material had a thickness of 5 mm and a density of 0.75 g/cm$^3$. When the bending strength of the structural material was measured according to JIS K 7203, the bending strength of 292 kg·f/cm$^2$ and the flexed amount was 12.4 mm. Also, the elasticity was 19400 kg·f/cm$^2$. In addition, it was tried to peel off the phenol resin layer from the PAT foamed sheet at the interface but the layer could not easily be peeled off. Thus, it was confirmed that the structural material could be sufficiently used as the structural materials for motor cars, airplanes, and ships.

EXAMPLE 9

By following the same procedure as Example 8 except that the foaming agent mixed with the phenol resin was not used, a structural material was prepared.

The structural material obtained had a thickness of 5 mm and the density of 0.75 g/cm$^3$. The bending strength of the structural material was 254 kg·f/cm$^2$, the flexed amount thereof was 6.93 mm, and the elasticity was 22800 kg·f/cm$^2$. Thus, the aforesaid material could be used as a structural material but the flexibility was poor as compared with the product in Example 8.

EXAMPLE 10

In this example, the compounding ratio of the fibers and foaming agent-containing thermosetting resin in Example 8 was changed, the same PET foamed material as in Example 8 was used, and the sticking condition of the PET foamed material and the thermosetting resin sheet was changed.

That is, the glass fiber mat (FEM-300-04) as used in Example 8 was impregnated with a mixture of 19 g of the phenol resin (PF-0015), 2.8 g of the curing agent (CA-645), and 1 g of the foaming agent (AA-30) each being used in Example 8 to provide an uncured thermosetting resin sheet. Thus, two such thermosetting resin sheets were prepared.

The PET foamed material as used in Example 8 was placed between the thermosetting resin sheets and the laminated assembly was pressed in a press for 30 minutes at 80° C. and at a pressing pressure of 35 kg/cm$^2$ to provide a structural material.

The structural material had a thickness of 5 mm and the density of 0.59 g/cm$^3$. Also, the bending load was 1.2 kg·f, the bending strength was 302 kg·f/cm$^2$, the flexed amount was 10.9, and the elasticity was 14900 kg·f/cm$^2$.

EXAMPLE 11

By following the same procedure as Example 10 except that the foaming agent mixed with the phenol resin was not used, a structural material was prepared.

The structural material obtained had a thickness of 5 mm and a density of 0.59 g/cm$^3$. Also, the bending load was 15.3 kg·f, the bending strength was 222 kg·f/cm$^2$, the flexed amount was 7.64 mm, and the elasticity was 21400 kg·f/cm$^2$.

EXAMPLE 12

Production of PET Foamed Material

From the foamed sheet (having the density of 0.2 g/cm$^3$ and the thickness of 3 mm) obtained in Example 8, five regular square sheets each having one side length of 250 mm were cut. Three such sheets were superposed to each other, a regular square polyester series hot melt film (PS-2810, trade name, made by Daicel Chemical Industries, Ltd.) having one side length of 250 mm and a thickness of 50 μm was inserted between each two sheets and the assembly thus obtained was placed in a press. The assembly was heated to 180° C. for 2 minutes while applying a pressure of 0.2 kg/cm² to provide a primary PET laminate.

Furthermore, the remaining two uncured thermosetting resin sheets each was applied to both the surface of the primary PET laminate, a regular square polyester series hot melt film (PS-2810, trade name, made by Daicel Chemical Industries, Ltd.) having one side length of 250 mm and a thickness of 50 μm was inserted between the primary PET laminate and each sheet as described above, the assembly was placed in a press, and heated to 180° C. for 2 minutes while applying thereto a pressure of 0.2 kg/cm² to provide a secondary PET laminate.

The reason of laminating in twice as described above is that since the PET sheet itself is a heat-insulating material, if large sheets are laminated once, the inside layers are not adhere to each other.

Thermosetting Resin Containing Fibers and Foaming Agent

By uniformly impregnating 250 mm square of a glass fiber mat (FEM-300-04, trade name, made by Fuji Fiber Glass K.K.) having a basis weight of 300 g/m² with a mixture of 192 g of a phenol resin (PF-0015, trade name, made by Asahi Yuuki Zai K.K., viscosity 5100 cp/25° C.), 29 g of a curing agent (CA-645, trade name, made by the aforesaid company), and 12 g of a foaming agent (AA-30, trade name, made by the aforesaid company), an uncured thermosetting resin sheet containing the fibers and the foaming agent. Two such sheets were prepared.

Production of Structural Material

The PET foamed sheet was placed between the aforesaid uncured thermosetting resin sheets containing the fibers and the foaming agent and the laminated assembly was placed in a mold frame.

The mold frame was a frame prepared by punching a regular square having one side length of 250 mm at the center of a regular square metal plate having a thickness of 28 mm and one side length of 280 mm and was a square frame having a width of 15 mm. The laminate assembly placed in the mold frame had a space capable of expanding in the thickness direction of the sheet. The mold frame containing the assembly was placed in a press and heated to 80° C. for 30 minutes while applying thereto a pressure of 45 kg/cm² to provide a structural material.

The structural material had a thickness of 28 mm and a density of 0.41 g/cm³. Also, the heat conductivity thereof was 0.0339 Kcal/m·hr·° C. at 20° C.

COMPARISON EXAMPLE 6

In the comparison example, a PET foamed material was not used.

Thermosetting Resin Containing Fibers and Foaming Agent

By uniformly impregnating 250 mm square of a glass fiber mat having a basis weight of 300 g/m² (FEM-30004, trade name, made by Fuji Fiber Glass K.K.) with a mixture of 330 g of a phenol resin (PF-0015, trade name, made by Asahi Yuuki Zai K.K., viscosity 5100 cp/25° C.), 50 g of a curing agent (CA-645, trade name, made by the aforesaid company), and 17.5 g of a foaming agent (AA30, trade name, made by the aforesaid company), an uncured thermosetting resin sheet containing the fibers and the foaming agent was obtained. Such two sheets were prepared.

Production of Structural Material

The aforesaid two uncured thermosetting resin sheets containing the fibers and the foaming agent were superposed to each other and placed in the mold frame as used in Example 12. The laminate placed in the mold frame had a space capable of expanding in the thickness direction of the sheet, The mold frame containing the laminate was placed in a press and heated to 80° C. for 30 minutes while applying thereto a pressure of 45 kg/cm² to provide a structural material.

The structural material obtained had a thickness of 28 mm and a density of 0.42 g/cm³. Also, the heat conductivity thereof was 0.0494 Kcal/m·hr·° C. at 20° C.

While the invention has been described in detail and with reference to specific embodiments thereof, it will be apparent to one skilled in the art that various changes and modifications can be made therein without departing from the spirit and scope thereof.

What is claimed is:

1. A thermoplastic polyester series foamed material having a thickness of at least 3 mm and an apparent density of from 0.05 to 0.7 g/cm³, wherein the crystallinity of the resin in the surface portion within 0.5 mm from the surface of the foamed material is not more than 30% and at least 1% lower than the crystallinity of the resin in the central portion of the foamed material.

2. The thermoplastic polyester series resin foamed material as in claim 1, wherein the whole mean crystallinity thereof is from 15 to 50%.

3. The thermoplastic polyester series resin foamed material as in claim 1, wherein the crystallinity in the surface portion is from 14 to 30%.

4. The thermoplastic polyester series resin foamed material as in claim 1, wherein the crystallinity in the surface portion is at least 1.5% lower than the crystallinity in the central portion.

5. The thermoplastic polyester series resin foamed material as in claim 1, wherein the foamed material has a thickness of from 3 to 50 mm.

6. The thermoplastic polyester series resin foamed material as in claim 1, wherein the bending strength thereof is from 50 to 100 kg·f/cm².

7. The thermoplastic polyester series resin foamed material as in claim 1, wherein the nailing strength is from 9.5 to 25.0 kg·f.

8. The thermoplastic polyester series resin foamed material as in claim 1, wherein the thermoplastic polyester series resin is polyethylene terephthalate, polybutylene terephthalate, a polybutylene terephthalate elastomer, polycyclohexane terephthalate, or polyethylene naphthalate.

* * * * *

UNITED STATES PATENT AND TRADEMARK OFFICE
Certificate

Patent No. 5,134,028                                                         Patented: July 28, 1992

On petition requesting issuance of a certificate for correction of inventorship pursuant to 35 U.S.C. 256, it has been found that the above-identified patent, through error and without any deceptive intent, improperly sets forth the inventorship.

Accordingly, it is hereby certified that the correct inventorship of this patent is: Motoshige Hayashi; Norio Amano; Takaaki Hirai; and Takeshi Taki, all of Nara, Japan.

Signed and Sealed this Thirteenth Day of June, 2000.

JAMES J. SEIDLECK
*Supervisory Patent Examiner*
Technology Center 1700

(12) REEXAMINATION CERTIFICATE (4500th)
United States Patent
Hayashi et al.

(10) Number: US 5,134,028 C1
(45) Certificate Issued: Dec. 11, 2001

(54) THERMOPLASTIC POLYESTER SERIES RESIN FOAMED MATERIAL AND PRODUCTION PROCESS THEREOF

(75) Inventors: Motoshige Hayashi; Norio Amano; Takaaki Hirai; Takeshi Taki; Masatoshi Ishibashi, all of Nara (JP)

(73) Assignee: Sekisui Kaseihin Kogyo Kabushiki Kaisha, Nara (JP)

Reexamination Request:
No. 90/005,318, Apr. 6, 1999

Reexamination Certificate for:
Patent No.: 5,134,028
Issued: Jul. 28, 1992
Appl. No.: 07/633,851
Filed: Dec. 26, 1990

(30) Foreign Application Priority Data

Dec. 27, 1989 (JP) .................................................. 1-344249
Dec. 27, 1989 (JP) .................................................. 1-344250
Jul. 9, 1990 (JP) .................................................. 2-182371

(51) Int. Cl.[7] ........................................................ C08J 9/14
(52) U.S. Cl. ............................... 428/332; 264/53; 264/54; 521/79; 521/182
(58) Field of Search .......................... 428/36.5, 319.7, 428/332; 521/182, 138

(56) References Cited

U.S. PATENT DOCUMENTS

| | | | |
|---|---|---|---|
| 3,299,192 | * | 1/1967 | Lux ........................................ 521/182 |
| 4,224,264 | * | 9/1980 | Ort et al. ............................... 521/182 |
| 4,312,960 | * | 1/1982 | Ort et al. ............................... 521/182 |
| 4,429,060 | * | 1/1984 | Ide ........................................ 521/182 |
| 4,462,947 | * | 7/1984 | Huggard ................................ 521/182 |
| 5,000,991 | | 3/1991 | Hayashi et al. ...................... 428/36.5 |

FOREIGN PATENT DOCUMENTS

0112058 * 6/1984 (EP) .
1008137 * 10/1965 (GB) .

OTHER PUBLICATIONS

Database WPI, No. 85–239402 (39) Derwent Pub. Ltd London, G.B. & JAA155243 bas sur Pr; 84JP0011523 (Toyobo K.K.) Jan. 24, 1984.*

Plastverabeiter, vol.: 29 No. 5, May 1978, pp. 256–266, Speyer, DE; P. Gebauer: "Strukturschaum aus Polybutylen-terephthalat".*

Pat. abstracts of Japan vol. 6 No. 83 (M–130) (961) May 21, 1982, & JPA–5720333 (Teijin K.K.) Feb. 2, 1982.*

* cited by examiner

*Primary Examiner*—Morton Foelak

(57) ABSTRACT

A thermoplastic polyester series foamed material having a thickness of at least 3 mm and an apparent density of from 0.05 to 0.7 g/cm$^3$ is disclosed, wherein the crystallinity of the resin in the surface portion within 0.5 mm from the surface of the foamed material is not more than 30% and at least 1% lower than the crystallinity of the resin in the central portion of the foamed material.

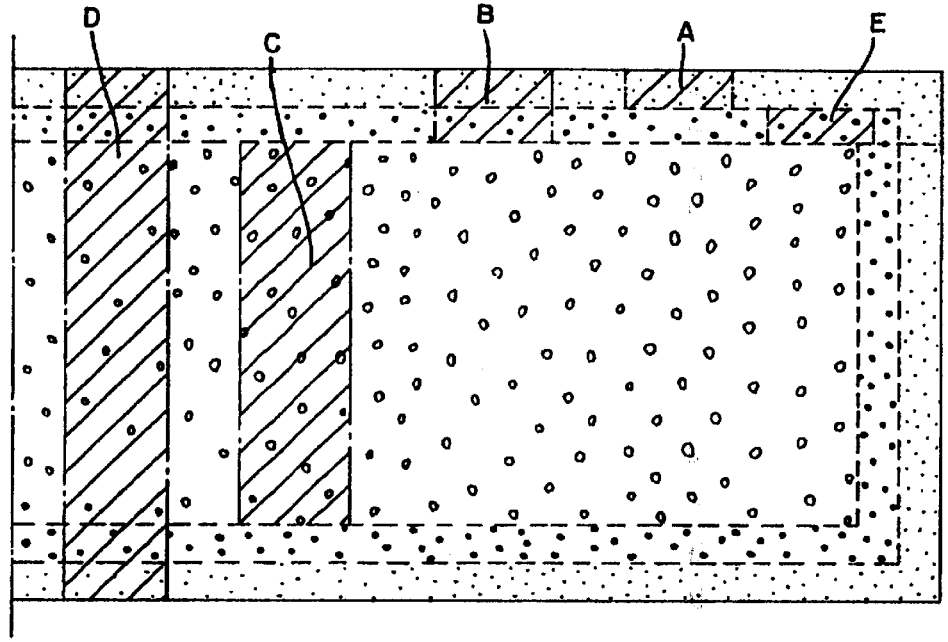

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 14, lines 31–45:

The foamed board was cut perpendicularly to the extruding direction and the section was observed. As the result thereof, a shell having a different foamed state was observed within the range of 2 mm (perpendicular [o] *to* the surface) from the surface. When the properties of the foamed board were measured, the mean density was 0.35 g/cm$^3$, the density of the surface portion (thickness of 0.5 mm) was 0.38 g/cm$^3$, the density of the central portion was 0.35 g/cm$^3$, the whole mean crystallinity was 30.7%, the crystallinity of the surface portion was 26.7%, and the crystallinity of the central portion was 30.8%. Also, the bending strength thereof was 95.3 [kg·f/cm$^3$] *kg·f/cm$^2$*, the bend-flexed amount was 2 mm, and the nailing off strength was 20 kg·f.

AS A RESULT OF REEXAMINATION, IT HAS BEEN DETERMINED THAT:

Claim 1 is determined to be patentable as amended.

Claims 2–8, dependent on an amended claim, are determined to be patentable.

New claims 9–18 are added and determined to be patentable.

1. A thermoplastic polyester series *resin* foamed material having *excellent mechanical strength suitable for use as a structural material in construction, building or electrical housing applications, wherein the foamed material has a thickness of at least 3 mm and an apparent density of from 0.05 to 0.7 g/cm$^3$, wherein the crystallinity of the resin in the surface portion within 0.5 mm from the surface of the* foamed material is not more than 30% and at least 1% lower than the crystallinity of the resin in the central portion of the foamed material *and wherein the whole mean crystallinity of the foamed material ranges from 22.1% to 50%* .

9. *The thermoplastic polyester series resin foamed material as in claim 1, wherein the crystallinity of the resin in the surface portion is at least 2.1% lower than the crystallinity of the resin in the central portion.*

10. *A thermoplastic polyester series resin foamed material having excellent mechanical strength suitable for use as a structural material in construction, building or electrical housing applications, wherein the foamed material has a thickness of at least 3 mm and an apparent density of from 0.05 to 0.35 g/cm$^3$, wherein the crystallinity of the resin in the surface portion within 0.5 mm from the surface of the foamed material is not more than 30% and at least 1% lower than the crystallinity of the resin in the central portion of the foamed material and wherein the whole mean crystallinity of the foamed material ranges from 22.1% to 50%.*

11. *The thermoplastic polyester series resin foamed material as in claim 10, wherein the whole mean crystallinity thereof is from 15 to 50%.*

12. *The thermoplastic polyester series resin foamed material as in claim 10, wherein the crystallinity in the surface portion is from 14 to 30%.*

13. *The thermoplastic polyester series resin foamed material as in claim 10, wherein the crystallinity in the surface portion is at least 1.5% lower than the crystallinity in the central portion.*

14. *The thermoplastic polyester series resin foamed material as in claim 10, wherein the foamed material has a thickness of from 3 to 50 mm.*

15. *The thermoplastic polyester series resin foamed material as in claim 10, wherein the bending strength thereof is from 50 to 100 kg·f/cm$^2$.*

16. *The thermoplastic polyester series resin foamed material as in claim 10, wherein the nailing strength thereof is from 9.5 to 25.0 kg·f.*

17. *The thermoplastic polyester series resin foamed material as in claim 10, wherein the thermoplastic polyester series resin is polyethylene terephthalate, polybutylene terephthalate, a polybutylene terephthalate elastomer, polycyclohexane terephthalate, or polyethylene naphthalate.*

18. *The thermoplastic polyester series resin foamed material as in claim 10, wherein the crystallinity of the resin in the surface portion is at least 2.1% lower than the crystallinity of the resin in the central portion.*

* * * * *